United States Patent [19]

Jackson et al.

[11] 4,003,838
[45] Jan. 18, 1977

[54] WATER LOSS REDUCTION AGENTS

[75] Inventors: Jack M. Jackson, Houston; Arlynn H. Hartfiel, Alvin, both of Tex.

[73] Assignee: Chemical Additives Company, Houston, Tex.

[22] Filed: Oct. 3, 1975

[21] Appl. No.: 619,203

Related U.S. Application Data

[63] Continuation of Ser. No. 355,166, April 27, 1973, abandoned.

[52] U.S. Cl. .................. 252/8.5 A; 252/8.5 C; 252/8.5 P; 252/8.55 R
[51] Int. Cl.² .................................. C09K 7/02
[58] Field of Search .......... 252/8.5 A, 8.5 C, 8.5 P, 252/8.55 R

[56] References Cited

UNITED STATES PATENTS

| | | | |
|---|---|---|---|
| 2,557,473 | 6/1951 | Ryan | 252/8.5 |
| 2,561,418 | 7/1951 | Ryan | 252/8.5 |
| 2,732,343 | 1/1956 | Rowe | 252/8.5 |
| 2,884,413 | 4/1959 | Kerr et al. | 252/8.5 |
| 3,032,498 | 5/1962 | Walker | 252/8.5 |
| 3,319,715 | 5/1967 | Parks | 252/8.5 |
| 3,852,201 | 12/1974 | Jackson | 252/8.5 |

*Primary Examiner*—Herbert B. Guynn
*Attorney, Agent, or Firm*—Kenneth H. Johnson

[57] ABSTRACT

Starch derivatives have been found to be effective water loss control additives in clay-free wellbore fluids. Generally the starch derivatives are starch ethers, starch esters and partially oxidized starch. The starch derivatives can be added to the wellbore fluid in either the gelatinized or ungelatinized form. Unlike ordinary unmodified starch, the starch derivatives are soluble in acids, stable in the presence of calcium chloride, do not undergo retrogradation and are stable at higher temperatures than unmodified starch.

6 Claims, No Drawings

WATER LOSS REDUCTION AGENTS

This is a continuation of application Ser. No. 355,166, filed Apr. 27, 1973, now abandoned.

BACKGROUND OF THE INVENTION

This invention relates to wellbore fluids, including drilling fluids, completion fluids, workover fluids, packer fluids, that is, all of those fluids which are employed over the course of the life of a well.

Generally wellbore fluids will be either clay-based or brines which are clay-free. These two classes are exclusive, that is, clay-based drilling fluids are not brines. A wellbore fluid can perform any one or more of a number of functions. For example, the drilling fluid will generally provide a cooling medium for the rotary bit and a means to carry off the drilled particles. Since great volumes of drilling fluid are required for these two purposes, the fluids have been based on water. Water alone, however, does not have the capacity to carry the drilled particles from the borehole to the surface.

In the drilling fluid class, clay-based fluids have for years preempted the field, because of the traditional and widely held theory in the field that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result the drilling fluids are usually referred to as "muds." In other areas where particle carrying capacity may not be as critical, such as completion or workover, brine wellbore fluids are extensively employed. The use of clay-based drilling muds has provided the means of meeting the two basic requirements of drilling fluids, i.e., cooling and particle removal. However, the clay-based drilling muds have created problems for which solutions are needed. For example, since the clays must be hydrated in order to function, it is not possible to employ hydration inhibitors, such as calcium chloride, or if employed, their presence must be at a level which will not interfere with the clay hydration. In certain types of shales generally found in the Gulf Coast area of Texas and Louisiana, there is a tendency for the shale to disintegrate by swelling or cracking upon contact with the water if hydration is not limited. Thus the uninhibited clay-based drilling fluids will be prone to shale disintegration.

The drilled particles and any heaving shale material will be hydrated and taken up by the conventional clay-based drilling fluids. The continued addition of extraneous hydrated solid particles to the drilling fluid will increase the viscosity and necessitated costly and constant thinning and reformulation of the drilling mud to maintain its original properties.

Another serious disadvantage of the clay-based fluids is their susceptibility to the detrimental effect of brines which are often found in drilled formations, particularly Gulf Coast formations. Such brines can have a hydration inhibiting effect, detrimental to the hydration requirement for the clays.

A third serious disadvantage of clay-based drilling fluids arises out of the thixotropic nature of the fluid. The separation of drilled particles is inhibited by the gel strength of the drilling mud. Settling of the drilled particles can require rather long periods of time and require settling ponds of large size.

Other disadvantages of clay-based drilling fluids are their (1) tendency to prevent the escape of gas bubbles, when the viscosity of the mud raises too high by the incidental addition of hydratable material, which can result in blowouts; (2) the need for constant human control and supervision of the clay-based fluids because of the expectable, yet unpredictable, variations in properties; and (3) the formation of a thick cake on the internal surfaces of the wellbore.

The brines have the advantage of containing hydration inhibiting materials such as potassium chloride, calcium chloride or the like. Quite apparently any solid particulate material would be easily separated from the brine solution since it is not hydrated. Thus, the properties of the brine are not changed by solid particulate matter from the wellbore. Similarly, since there is no opportunity for gas bubbles to become entrapped, blowouts are less likely in a clay-free brine-type wellbore fluid.

Recently it has been found that superior wellbore fluids having solid particle carrying capacity without gel strength could be prepared by employing a viscosifying amount of hydroxyethyl cellulose stabilized with magnesia in a brine. This is disclosed in greater detail in the copending patent application of Jack M. Jackson, Ser. No. 101,177 filed Dec. 23, 1970 now abandoned, which is incorporated herein. Commercial embodiments of this discovery are available from several sources, for example, Brinadd Company, Houston, Tex., in an additive package sold under the name "Bex."

Thus, the wellbore art now has two competing and incompatible systems which can be used in a full range of wellbore operations, i.e., the problem plagued clay-based wellbore fluids or the improved clay-free brine wellbore fluids. In many areas of application, as noted above, clay-free brines are already the usual selection.

A common problem for both clay-based and clay-free brine wellbore fluids is water loss. A number of approaches have been employed to prevent water loss into the penetrated formation. For example, lignosulfonate salts are frequently employed for that purpose. Also oil has been employed as a water loss control agent.

Starch has been employed in both clay-free brine and clay-based wellbore fluids to aid in water loss control and under certain limited conditions it has been effective. However, in clay-free brine wellbore fluids serious drawbacks have been observed with starches. At temperatures around 300° F. fluid loss control is abrogated, that is, the starch no longer provides any fluid loss control.

Another area where starches have proved unsatisfactory is in clay-free brine completion fluids, workover fluids and the like, where acid (generally HCL) is employed. The problem arises because the starches are not sufficiently acid soluble. This problem is particularly serious in injection wells where the insoluble starch can create pockets or block strata which the acid will not leach out, thus resulting in irregular injection into the formation when the well is employed for that purpose.

A particular problem encountered in using starch in clay-free brine wellbore fluids is the instability of the starches in the presence of calcium chloride brines. Generally, the starches begin to break down after about twenty four hours in the presence of calcium chloride.

Starch may undergo retrogradation which is a spontaneous tendency to associate and partially crystallize. The associated particles may precipitate and there appears to be a reverting to original cold water insolubility.

Thus although starches have been employed in clay-based fluids, they have generally not been successfully employed with the brine wellbore fluids. It is not surprising to note that the art has grouped all starches together and has considered the starch derivatives as no better or substantially equivalent to unmodified starches. Thus in U.S. Pat. No. 3,032,498 a cyanoethylated starch was described as a water loss reduction additive, which is not in itself surprising, however, brine-type fluids were excluded and a thin impervious layer was required to be formed on the walls of the borehole by a thixotropic clay based mud.

It is a feature of the present invention to provide a fluid loss control additive for clay-free wellbore fluids having improved high temperature stability, improved acid solubility and improved stability in the presence of calcium chloride. It is also a feature of the present invention to provide a clay-free hydration inhibited brine wellbore fluid having improved fluid loss control at high temperatures, improved component solubility and longer useful life. It is a further feature of the present invention to provide a method for drilling porous subsurface formations and obtaining improved water loss control.

It is an advantage of the present invention that the fluid control component of the clay-free wellbore fluids is stable at temperatures above 300° F., is acid soluble and is not adversely affected by other components of the clay-free wellbore fluids.

It is a further feature of the present invention to provide a clay-free brine drilling fluid having solid particle carrying capacity of a non-thixotropic type which is inhibited against hydration and which has improved fluid loss control at high temperatures, acid solubility and longer operation with constant fluid loss control. These and other advantages and features will be apparent from the following discussion and description of the invention and several of the embodiments thereof.

SUMMARY OF THE INVENTION

In accordance with the various features and advantages set forth, it has been found that an aqueous clay-free wellbore fluid for use in subterranean formations in the earth has reduced water loss if a starch derivative is added thereto. Briefly stated, the clay-free wellbore fluid comprises water, at least 1% by weight based on water of a brine forming soluble salt and derivative of starch in an amount sufficient to provide water loss control.

It has now been surprisingly found that organic starch derivatives, including the cationic starches, will provide water loss control in clay-free brine wellbore fluids at temperatures above 300° F. and furthermore, the derivative starches are not unstable in the presence of calcium chloride brine as are ordinary unmodified starches and are generally acid soluble.

The term "organic derivative of starch" or "organic starch derivative" means amylaceous substances which have been modified, for example, by etherification or esterification. The amylaceous substances may be derived from any source, including corn, wheat, potato, tapioca, waxy maize, sago, rice, grain sorghum and arrowroot. It has been found that, whereas ordinary unmodified starch has the disadvantages previously shown, the derivative starches of the present invention are far superior and not so disadvantaged for use in wellbore fluids. The mechanism for this unexpected superiority of the present modified starches is not presently known with certainty. However, a possible bromides, for the surprising performance of the derivative starch is that the derivative group makes the starch molecule more bulky and less prone to crystalline structure, i.e., the stereospecific arrangement of the starch molecule may have been disarranged so that the derivative starch is atactic.

The derivative modified starches of the present invention may be added to the wellbore fluid in either the gelatinized or ungelatinized form. Pregelatinization is not necessary. The present modified starches provide fluid loss control and all of the improvements noted herein, when employed in either gelatinized or ungelatinized form.

The wellbore fluids concerned in the present invention are those typically known as "brines." As the term brine is employed here it means at least 1% by weight of soluble salt of potassium, sodium or calcium in water. In addition, the brine may contain other soluble salts of, for example, zinc chromium, iron, copper and the like. Generally, the chlorides are employed because of availability, but other salts such as the brmides, sulfates and the like can be used. The soluble salts of the brine not only furnish the weighting material by adjusting the density of the solution, but also typically furnish the cations for inhibiting the fluid against hydration of solid materials.

The modified starches are preferably employed in an amount which will provide the maximum fluid loss reduction and beyond which additional derivative starch has little additional effect. This amount will vary not only as a result of the other components of the brine but also as a function of the subterranean formation in which it is employed. As a general observation, it has been found that the fluid loss reduction is obtained with starch derivative present in at least an amount in the range of about 0.15 to 30 grams per liter of the wellbore fluid. More preferably, at least an amount of starch derivative in the range of 0.9 to 12 grams per liter of wellbore fluid would be employed. The present invention also encompasses the novel concept of derivative starches for reduction of water loss in aqueous clay-free brine wellbore fluids used in subterranean formation of the earth, that is, an additive to clay-free brine wellbore fluids which will reduce water loss.

The minimum amounts specified here for the derivative starch are essential if the benefits of the present invention are to be fully received and the range of amounts is a minimum range, that is, the minimum amount may vary within the range depending on the nature of the wellbore fluid, e.g., concentration of salts, other additives, etc., the use to which fluid is to be put, the conditions to be encountered in use, the nature of the formation and the like. Generally the optimum amount of derivative starch will fall in these ranges, however, excess amounts of derivative starch may be employed without detriment. Economic considerations will normally determine an upper limit. It is a unique property of the non-clay based wellbore fluids that rather large excesses of starch can be tolerated without any significant effect on the properties of the wellbore fluid. This is not the case with clay-based drilling fluids, where the fluid is physically crowded by the clay particles and the addition of starch for water loss control, for example, can appreciably increase the viscosity of the fluid.

Numerous derivatives of starch have been described in the art. Their synthesis and properties are outlined in detail in hundreds of papers and patents. An excellent and relatively recent compilation of much of this information is presented in "Starch and Its Derivatives," 4th Ed., J. A. Radley, Chapman and Hall Ltd.; London 1968. The particular method of preparation is not of interest here and forms no part of this invention insofar as the derivative product.

Included among the suitable organic derivatives of starch are etherified starch, esterified starch and partially oxidized starch.

Some particular etherified starches would include alkylated ethers, prepared for example by treating the starch with an alkyl sulfate and alkali to convert the free hydroxy groups to alkoxyl producing, e.g., a methyl or ethyl ether derivative. Other types of ethers such as hydroxyethylated starch, prepared by mixing starch with dry powdered sodium hydroxide, aging, followed by treatment with ethylene oxide are included. Similarly carboxyalkyl ethers such as carboxymethyl ether of starch prepared by the action of chloroacetic acid on starch in the presence of alkali; sulfur containing ethers such as those taught in British Pat. No. 895,406 and the phosphorus analogues are suitable. The so-called "cationic" nitrogenous starch ethers such as the derivative from the reaction of starch with the reaction product of epihalohydrin and a tertiary amine or the amine salts in the presence of strongly alkaline catalysts are also suitable for the present invention. Other nitrogenous starch ethers include the cyanoalkyl ethers produced by the reaction of starch and acylonitrile. A further listing of suitable nitrogenous starch ethers is described, for example, in U.S. Pat. Nos. 2,813,093; 2,842,541; 2,894,944; 2,917,506 and 2,970,140.

A broadly applicable method of ether preparation for a large number of suitable ethers was disclosed by Graver et al. in U.S. Pat. Nos. 2,671,779; 2,671,780 and 2,671,781, which briefly involved the reaction of an alkalinated starchate with an organic halogen compound.

A particularly preferred class of starch derivatives are starch ethers of the general formula

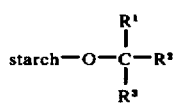

where $R^1$ is $CH_2OH$, or H; $R^2$ is hydrocarbyl or H; $R^3$ is hydrocarbyl, H, COOH, $CH_2R^4OH$, or $NR^5R^6$; $R^4$ is hydrocarbyl; $R^5$ and $R^6$ are H or hydrocarbyl. Generally each hydrocarbyl group has from 1 to 8 carbon atoms and is alkyl, cycloalkyl, aryl, alkaryl or aralkyl. Most preferably, the hydrocarbyl groups are alkyl of 1 to 6 carbon atoms. Each hydrocarbyl is independently selected.

The starch esters may be generally prepared by treating the starch with an organic acid, acid anhydride or acid chloride in presence of an alkaline catalyst such as a tertiary amine or an alkali hydroxide. Specifically water soluble starch formate, starch acetate, starch benzoate and the like have been prepared as well as mixed starch esters such as acetate-butyrate and acetate-formate.

The partial oxidation of starches, for example, with nitric acid introduces carboxyl and carbonyl groups into the starch to produce suitable organic starch derivatives for use in this invention.

Many of the organic starch derivatives described above are commercially available and have been used in the past as sizing agents for paper and cloth or for other purposes. It should be appreciated that the present starch derivatives are as varied as the starch starting materials and suitable derivative starches for this invention may have number average molecular weights of from 20,000 to several hundred thousands, e.g., 400,000-600,000.

It is apparent that since there are multiple sites available for esterification and/or etherification on the starch molecule that there may be from one to several ester or ether functions on a single starch molecule. Thus the chemically modified starches may contain up to the theoretical value of substituent groups or components thereof, based on the glucose units available or may contain only a fractional portion of functional groups based on available sites. Similarly the starches may be cross linked by the use of di- or trifunctional esterification or etherification agents. Within the limits previously given, all such normal and obvious variants of the chemically modified starch are within the scope of the present invention. It is also within the present invention to employ mixtures of starch derivatives, i.e., different ethers or mixtures of ethers and esters and partially oxidized starches.

In addition to soluble brine salts and modified starches, the present wellbore fluids can contain other conventional wellbore additives, such as oil for producing water-in-oil or oil-in-water emulsions, viscosifiers such as hydroxyethyl cellulose, gums, and the like, lignosulfonate salts such as calcium or chromium lignosulfonates, emulsifiers, weighting agents, calcium carbonate, magnesia and other agents. It is understood that not all of these possible constituents will be present in any one wellbore fluid but their selection and use will be governed by other constituents and the use for which the wellbore fluid is intended.

A detailed description of the use of hydroxyethyl cellulose in wellbore fluids is given in copending application of Jack M. Jackson, Ser. No. 101,177 filed Dec. 1, 1972, which is incorporated herein.

SPECIFIC EMBODIMENTS

EXAMPLES 1-10

In the following examples the acid solubility of an unmodified starch and several starch derivatives are compared.

Each sample was prepared by dispersing 8 grams of the starch in 175 ml of fresh water. The dispersion was aged for 1 hour and an additional 175 ml of fresh water added, bringing total volume to 350 ml. This dispersion was heated to 150° F. and cooled in air to room temperature (75° F.). The test consisted of measuring the time (in seconds) required for 300 ml of water to pass through a double layer of Baroid Specially Hardened Filter Paper using a Baroid API filtration cell at 100 psi and 75° F. The results are set out in TABLE I. These runs demonstrate the properties of the test starches in non-acid systems.

To demonstrate the acid solubility of the derivative starches as opposed to the insolubility of the unmodified starch a second set of runs was conducted under the same conditions except that the additional 175 ml of fresh water contained 15% HCl to provide a total solution of 7.5% HCl. The filtration rate was determined in the same manner as for the first set of runs and the results are reported in TABLE II.

The DS or Degree of Substitution is a conventional term used in the art. Disregarding terminal units and some branching (amylopectin component of starch) there are considered to be 3.0 sites (OH) available in each glucose unit for reaction. Thus a DS of 0.2 indicates that 0.2 of the 3.0 sites available per unit are reacted or stated otherwise 6⅔% of the available sites are substituted. For the purpose of comparison, it is considered herein that a low DS is 0.2 or less, and a high DS is 2.0 or more.

EXAMPLES 11–15

A series of runs containing 4 pounds per barrel of starch or derivative starch, 2 pounds per barrel hydroxyethyl cellulose, ½ pound per barrel magnesium oxide and 4 pounds per barrel calcium carbonate in a NaCl brine (weighing 9.1 pounds per U.S. gallon) was carried out. Each sample was hot rolled at 175° F. for 18 hours and tested for fluid loss on a Baroid HTHP press at 500 p.s.i. differential. The total filtrate at 10 minute intervals was measured as the temperature was increased at approximately the same rate for each sample. The results are recorded in TABLE III.

EXAMPLES 16–20

A series of runs was made in a brine solution of NaCl (weighing 9.2 pounds per gallon), using 4 pounds per barrel of starch or derivative starch and 4 pounds per barrel of calcium carbonate. Each sample was hot rolled at 175° F. for 18 hours, then subjected to API filter loss test (100 p.s.i. differential for 30 minutes) at 75° F. (Baroid HTHP filter) and at 250° F. (½ the area of Baroid HTHP as tested at 75° F.). Each sample was 350 ml and 150 respectively. The test results are set out in TABLE IV.

EXAMPLES 21–25

A series of runs similar to those of Examples 16–20 was carried out using a CaCl$_2$ brine weighing 10.0 pounds per gallon. The results are reported in TABLE V.

Examples 1–25 demonstrate the superior character of the derivative starches as water loss control agents as compared to unmodified starch. First the starch derivatives are demonstrated to be superior in every instance to starch for acid solubility. Secondly, the high temperature stability of the derivative starches is greater than unmodified starch and the aged derivative starches generally show better filter loss characteristics than unmodified starch in brines. The starch is generally employed in conjunction with other materials, however, and in this regard the derivative starches have a surprising effect, as noted in the following examples.

EXAMPLE 26

These examples demonstrate the water loss control capacity of derivative starches according to the present invention even at very low concentration. Each run contains a simulated additive package of the type commonly incorporated along with starch for control of fluid loss, viscosity and loss circulation in drilling and workover fluids.

| The simulated additive package: | |
|---|---|
| | wt. % of package |
| Modified lignosulfonate | 33.85 |
| Magnesium oxide | 5.07 |
| Calcium carbonate | 54.99 |
| Hydroxyethyl cellulose | 4.23 |
| Lime hydrate | 0.59 |
| Chrom alum | 1.27 |

One gram of Hamaco 267 (hydroxypropyl ether of corn starch) was dispersed in 350 cc of a brine solution of NaCl weighing 9.1 pounds per gallon, i.e., 1 pound per barrel of HAMACO. The mixture was stirred for 10 minutes, then heated to 150° F. with stirring and allowed to cool for 2 hours. At that time 17.5 cc of this solution were added to 332.5 cc of 9.1 ppg NaCl brine to yield 0.1308% starch solution based on the weight of brine. Two grams of the simulated additive package was added to the 0.01308% solution and to 350 cc of 9.1 ppg NaCl brine solution as a control. Both samples were stirred for 10 minutes and allowed to stand at room temperature for 1 hour. At the end of that time, each was stirred 5 minutes and filter loss was measured by the standard API method using a Baroid test cell at 100 psi and 75° C. for 30 minutes.

The control sample showed total filtrate loss (350cc) within 30 minutes. The modified starch sample showed only 35 cc filtrate loss in 30 minutes.

EXAMPLE 27

This series of runs demonstrates the superiority of starch derivates according to the present invention over unmodified starch for fluid loss control over a high temperature range. Each sample was made up in a similar manner to Example 26, except that the starch or starch derivative was included in the simulated additive package.

| Simulated additive package: | |
|---|---|
| | wt. % of package |
| Modified lignosulfonate | 28.94 |
| Magnesium oxide | 4.34 |
| Calcium carbonate | 47.03 |
| Hydroxyethyl cellulose | 3.62 |
| Lime hydrate | 0.51 |
| Chrom alum | 1.09 |
| Starch or starch derivative | 14.47 |

Six pounds per barrel of additive package was added to a 11.6 pounds per gallon calcium chloride brine by stirring and heating. Each sample was then hot rolled at 175° F. for 18 hours. Each sample was tested for fluid loss on a Baroid HTHP press at 500 p.s.i. differential at 10 minute intervals with temperature increase being approximately the same for each run. The results of the tests are reported in TABLE VI.

TABLE I

| RUN NO. | Control | 1 | 2 | 3 | 4 | 5 |
|---|---|---|---|---|---|---|
| Starch Characterization | — | ¹unmodified corn starch | ²Hydroxypropyl ether corn starch | ³Amino ether corn starch | ⁴Amino ether potato starch | ⁵Hydroxyethyl ether potato starch |
| Filtration* Time for 300 ml (sec.) | 23.5 | 500+ | 500+ | 500+ | 500+ | 500+ |
| Physical** Appearance | 1 | 4 | 3 | 5 | 3 | 3 |

*500+ indicates test was stopped at 500 sec. and cell still contained liquid.
**1-clear, thin; 2-translucent, thin; 3-translucent, thick; 4-opaque, thin; 5-opaque, slightly thick
¹Tradename BASCO, sold by Milwhite Co., nonionic;
²Tradename Hamco 267, sold by A. E. Staley Manufacturing Co.; nonionic pregelantinized, DS (Degree of Substitution) between 0.2 and 2.0;
³Tradename Cato 15 sold by National Starch and Chemical Corp., cationic, DS between 0.2 and 2.0
⁴Tradename Astro Gum X-100 sold by Penick & Ford Ltd., cationic, DS between 0.2 and 2.0
⁵Tradename Essex Gum 1360 sold by Penick & Ford Ltd., nonionic, DS below 0.2, low molecular weight (acid hydrolyzed prior to etherification).

TABLE II

| RUN NO. | Control | 6 | 7 | 8 | 9 | 10 |
|---|---|---|---|---|---|---|
| Starch Characterization | — | ¹unmodified corn starch | ²Hydroxypropyl ether corn starch | ³Amino ether corn starch | ⁴Amino ether potato starch | ⁵Hydroxyethyl ether potato starch |
| Filtration* Time for 300 ml (sec.) | 23.5 | 500+ | 29.5 | 312 | 27 | 25 |
| Physical** Appearance | 1 | 4 | 2 | 2 | 1 | 1 |

*500+ indicates test was stopped at 500 sec. and cell still contained liquid.
**1-clear, thin; 2-translucent, thin; 3-translucent, thick; 4-opaque, thin; 5-opaque, slightly thick
¹Tradename BASCO, sold by Milwhite Co., nonionic.
²Tradename Hamco 267, sold by A. E. Staley Manufacturing Co.; nonionic pregelantinized, DS (Degree of Substitution) between 0.2 and 2.0
³Tradename Cato 15 sold by National Starch and Chemical Corp., cationic DS between 0.2 and 2.0
⁴Tradename Astro Gum X-100 sold by Penick & Ford Ltd., cationic, DS between 0.2 and 2.0
⁵Tradename Essex Gum 1360 sold by Penick & Ford Ltd., nonionic, DS below 0.2, low molecular weight (acid hydrolyzed prior to etherification).

TABLE III

| Example | Control | 11 | 12 | 13 | 14 | 15 |
|---|---|---|---|---|---|---|
| Starch | — | BASCO (unmodified corn starch) | HAMCO 267 (Hydroxypropyl ether corn starch) | CATO 15 (Amino ether corn starch) | Astro Gum X-100 (amino ether potato starch) | Essex 1360 (hydroxyethyl ether corn starch) |
| Apparent max. Temper. °F. | 300* | 320 | 360 | 320 | 290 | 350 |
| Basis of Maximum Temp. Determination | Complete Loss of Control | Total Filtrate > 50 ml | Total Filtrate > 50 ml. | Total Filtrate > 50 ml. | Total Filtrate > 50 ml. | Complete Loss of Control |

*Initial Temperature

TABLE IV

| Example | Control | 16 | 17 | 18 | 19 | 20 |
|---|---|---|---|---|---|---|
| Starch | — | BASCO (unmodified corn starch) | HAMCO 267 (hydroxypropyl ether corn starch) | CATO 15 (Amino ether corn starch) | Astro Gum X-100 (amino ether potato starch) | Essex 1360 (hydroxyethyl ether corn starch) |
| Filter Loss at 75° F. ml | 350 | 7.0 | 3.9 | 7.0 | 8.0 | 7.5 |
| Filter Loss at 250° F. ml | 350* | 10.0 | 8.0 | 54.0 | 145* | 145* |

*considered total loss

TABLE V

| Example | Control | 21 | 22 | 23 | 24 | 25 |
|---|---|---|---|---|---|---|
| Starch | — | BASCO (unmodified corn starch) | HAMCO 267 (hydroxypropyl ether corn starch) | CATO 15 (Amino ether corn starch) | Astro Gum X-100 (amino ether potato starch) | Essex 1360 hydroxyethyl ether corn starch) |
| Filter Loss at 75° F. ml. | 350 | 5.6 | 3.3 | 7.5 | 350* | 350* |
| Filter Loss at 250° F. | 350* | 6.8 | 27.5 | 45.5 | — | — |

TABLE V-continued

| Example | Control | 21 | 22 | 23 | 24 | 25 |
|---------|---------|----|----|----|----|----|
| ml      |         |    |    |    |    |    |

*considered total loss

TABLE VI

| Example | 27 | 28 | 29 |
|---------|----|----|----|
| Starch compound | BASCO (unmodified corn starch) | Cato 15 (amino ether corn starch) | HAMACO 267 (hydroxypropyl ether corn starch) |
| Start Temp.° F. | 200 | 190 | 200 |
| *Filtrate ml. | — | — | — |
| Δ Time, min. | 10 | 10 | 10 |
| Temp.° F. | 210 | 205 | 207 |
| *Filtrate ml. | 50 | 5 | 9 |
| Δ Time, min. | 10 | 10 | 10 |
| Temp.° F. | 234 | 232 | 222 |
| *Filtrate ml. | 58 | 7 | 12 |
| Δ Time, min. | 10 | 10 | 10 |
| Temp.° F. | 260 | 250 | 244 |
| *Filtrate ml. | 65 | 9½ | 16 |
| Δ Time, min. | 10 | 10 | 10 |
| Temp.° F. | 278 | 271 | 265 |
| *Filtrate ml. | 72 | 11½ | 18 |
| Δ Time, min. | 10 | 10 | 10 |
| Temp.° F. | 298 | 300 | 293 |
| *Filtrate ml. | 81 | 24 | 19 |
| Δ Time, min. | 10 | 10 | 10 |
| Temp. ° F. | 325 | 333 | 325 |
| *Filtrate ml. | 100** | 33 | 22 |
| 30 min. API 75° F. ml | 37 | 7 | 5 |

*Cumulative total of filtrate
**Went to total (350cc) at this point

Exhaustive testing of the myriad of starch derivatives suitable for the present invention and within the scope of the disclosure and claims has not been included, however, the starch ester and partial oxidation products of starch will perform in substantially the same manner as the starch ethers, giving the benefits recited above. The degree of the performance of the esters and partial oxides will vary just as the present data has shown there to be variation within the ethers, depending on the variable introduced, conditions of tests, amounts of starches, other constituents present, nature of substituents, etc.

The invention claimed is:

1. An aqueous clay-free, non-thixotropic wellbore fluid having improved fluid loss control at high temperatures for use in subterranean formations in the earth consisting essentially of water, at least 1% of a brine forming soluble salt or mixture of salts of potassium, sodium or calcium and hydroxypropyl ether starch in an amount sufficient to provide water loss control.

2. An aqueous clay-free, non-thixotropic wellbore fluid having improved fluid loss control at high temperatures for use in subterranean formations in the earth consisting essentially of water, at least 1% of a brine forming soluble salt or mixture of salts of potassium, sodium or calcium and hydroxypropyl ether starch, said hydroxypropyl ether starch being present in at least an amount in the range of about 0.15 to 30 grams per liter of wellbore fluid.

3. The aqueous clay-free wellbore fluid according to claim 2 wherein said starch ether is at least present in an amount of 0.9 grams per liter.

4. An aqueous clay-free drilling fluid according to claim 2 containing hydroxyethyl cellulose viscosifier.

5. A method for reducing water loss in subterranean formations surrounding a borehole in the earth comprising incorporating a starch derivative in preparing an aqueous clay-free, non-thixotropic brine composition consisting essentially of water, at least 1% of a brine forming soluble salt or mixture of salts of potassium, sodium or calcium and hydroxypropyl ether starch, said hydroxypropyl ether starch being present in at least an amount in the range of 0.15 to 30 grams per liter of wellbore fluid, injecting said brine into said borehole and thereafter withdrawing said brine from said borehole.

6. The method according to claim 5 wherein the amount of starch ether is at least from 0.9 to 12 grams per liter.

* * * * *

UNITED STATES PATENT OFFICE
CERTIFICATE OF CORRECTION

PATENT NO. : 4,003,838
DATED : January 18, 1977
INVENTOR(S) : Jack M. Jackson & Arlynn H. Hartfiel It is certified that error appears in the above-identified patent and that said Letters Patent are hereby corrected as shown below:

Column 2, line 63 reads "HCL" but should read -- HCl --

Column 4, lines 13-14 reads "bro-mides" but should read -- explanation --

Column 4, line 34 reads "brmides" but should read -- bromides --

Column 9-10, last line, TABLE V, under "Control", second item reads "350*" but should read -- 150* --

Signed and Sealed this

Thirty-first Day of August 1982

[SEAL]

Attest:

GERALD J. MOSSINGHOFF

Attesting Officer          Commissioner of Patents and Trademarks